United States Patent
Wolff

(10) Patent No.: US 12,521,255 B2
(45) Date of Patent: Jan. 13, 2026

(54) ANGLED TUBE FOR SURGICAL PROCEDURES

(71) Applicant: Spineology Inc., St. Paul, MN (US)

(72) Inventor: Kyle Wolff, St. Paul Park, MN (US)

(73) Assignee: Spineology Inc., St. Paul, MN (US)

(*) Notice: Subject to any disclaimer, the term of this patent is extended or adjusted under 35 U.S.C. 154(b) by 0 days.

(21) Appl. No.: 17/960,803

(22) Filed: Oct. 5, 2022

(65) Prior Publication Data

US 2023/0105805 A1    Apr. 6, 2023

Related U.S. Application Data

(60) Provisional application No. 63/252,345, filed on Oct. 5, 2021.

(51) Int. Cl.
*A61F 2/46* (2006.01)

(52) U.S. Cl.
CPC .................. *A61F 2/4611* (2013.01)

(58) Field of Classification Search
CPC ...... A61F 2/4611; A61F 2/4455–2/447; A61B 17/0218; A61B 17/80–17/8057; A61B 17/1728
See application file for complete search history.

(56) References Cited

U.S. PATENT DOCUMENTS

| | | | |
|---|---|---|---|
| 5,306,278 A * | 4/1994 | Dahl | A61B 17/17 408/241 G |
| 8,123,699 B2 * | 2/2012 | Lyon | A61B 17/3403 600/567 |
| 9,463,058 B2 * | 10/2016 | Matsuzaki | A61B 17/88 |
| 11,918,235 B1 * | 3/2024 | Streit | A61B 17/164 |
| 2013/0289354 A1 * | 10/2013 | Ainsworth | A61B 17/70 606/246 |
| 2017/0340358 A1 * | 11/2017 | Bullard | A61B 17/8042 |
| 2019/0091038 A1 * | 3/2019 | Boylan | A61F 2/4611 |
| 2019/0223905 A1 * | 7/2019 | Zeller | A61B 17/0057 |
| 2021/0085307 A1 * | 3/2021 | Sandham | A61B 90/361 |

* cited by examiner

*Primary Examiner* — Lynnsy M Summitt

(57) ABSTRACT

A surgical tube for spinal surgical procedures allows for lateral access to the L4/L5 disc space in the presence of a high iliac crest without going through the ilium. The tube has an angled jog that positions the distal portion of the tube on the cephalad side of the ilium. The angled tube can include fixation pin channels on the cephalad and caudal sides on the tube, going into the L4 and L5 vertebral bodies respectively. The L5 pin channel can have an angled inward portion corresponding to the jog of the tube, towards the center of L5. The L4 pin channel can be angled so that it starts at the caudal side of the tube at the proximal end of the tube and exits the tube on the cephalad side at the distal end of the tube.

14 Claims, 2 Drawing Sheets

ANGLED TUBE FOR SURGICAL PROCEDURES

PRIORITY

This application claims the benefit of U.S. Provisional Application Ser. No. 63/252,345, filed on Oct. 5, 2021, which is hereby incorporated herein by reference in its entirety.

FIELD

The present invention generally relates to devices used in orthopedic surgeries, and more particularly to instruments, implants, tools and methods used for spinal surgical procedures such as interbody fusion procedures.

BACKGROUND

In surgical procedures it is desirable to provide instruments, such as a portal tube that allow for convenient access to the patient's anatomy for performing the procedure and for delivering implants, instruments and the like while minimizing trauma to the patient. The portal tube can include one or more channels that allow the user to insert various fixation elements (e.g. fixation pins, intradiscal shims) or lighting elements through the tube.

There is an ongoing need to provide instruments, implants, tools and methods used for spinal surgical procedures such as interbody fusion procedures that improve upon the conventional art as discussed herein.

SUMMARY

The disclosed portal tube is angled to allow for lateral access to the L4/L5 disc space in the presence of a high iliac crest without going through the ilium. The portal tube includes an angled jog with respect to the tube body, which positions the proximal portion of the port on the cephalad side of the ilium. The angled portal tube can include fixation pin channels on the cephalad and caudal sides on the tube, going into the L4 and L5 vertebral bodies respectively.

In one example, the angled tube can include fixation pin channels on the cephalad and caudal sides on the tube, going into the L4 and L5 vertebral bodies respectively. The L5 pin channel can have an angled inward portion corresponding to the jog of the tube, towards the center of L5. The L4 pin channel can be angled so that it starts at the caudal side of the tube at the proximal end of the tube and exits the tube on the cephalad side at the distal end of the tube.

In another example, a surgical portal for intervertebral surgical fusion procedures comprises a longitudinally elongated hollow body with first and second channels defined therein. A portion of the body defines a jog inward adjacent to a distal end of the body. The first channel is defined longitudinally through the body from a proximal end thereof to a distal end thereof. The first channel is angled or includes an angled portion where the channel passes through the jog inward. The second channel is defined longitudinally through the body from the proximal end thereof to a distal end thereof. The second channel is angled so that the second channel begins at the proximal end of the body adjacent to a first lateral wall portion of the body and terminates at a distal end of the body adjacent to a second lateral wall portion that is located opposite the first lateral wall portion.

The surgical portal can further comprise a T-shaped slot defined longitudinally through the body from a proximal end thereof to a distal end thereof. The T-shaped slot can include an opening into an interior of the body that is narrower than a widest width dimension of the T-shaped slot.

When viewed in a lateral cross-section, the surgical portal can be shaped as a rectangle with rounded corners. The first channel and the second channel can each be shaped as circular bores when viewed in a lateral cross-section. The distal end of the body can be angled with respect to the proximal end of the body.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

Figure 1:
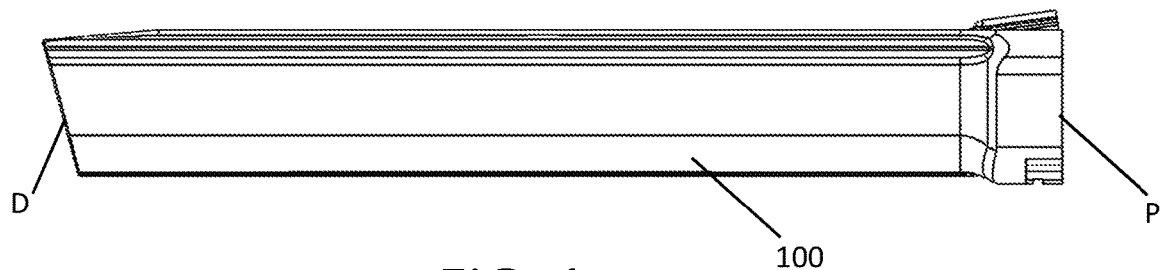
FIG. 1 is a first side view of a tubular portal in accordance with embodiments of the invention.
Figure 2:
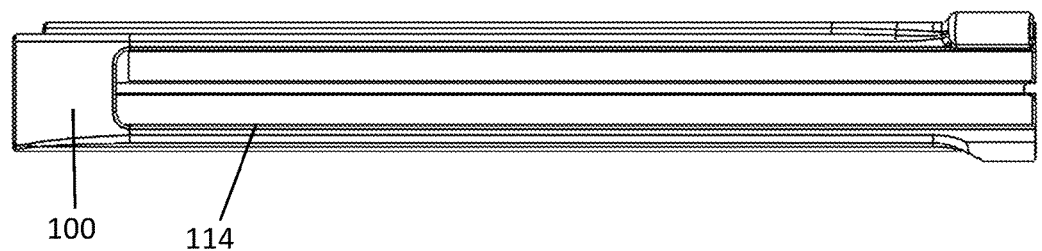
FIG. 2 is a rear view of a tubular portal in accordance with embodiments of the invention.
Figure 3:
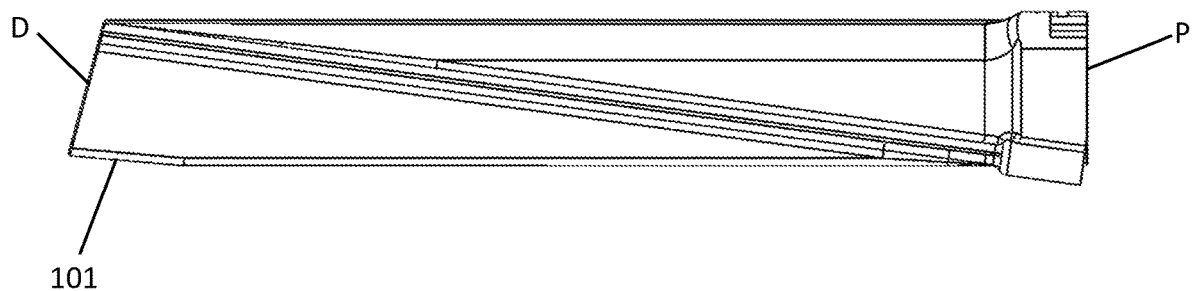
FIG. 3 is a second side view of a tubular portal, opposite the first side, in accordance with embodiments of the invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the spirit and scope of the invention as defined by the appended claims. For illustrative purposes, cross-hatching, dashing or shading in the figures is provided to demonstrate sealed portions and/or integrated regions or devices for the package.

DETAILED DESCRIPTION

In the following descriptions, the present invention will be explained with reference to example embodiments thereof. However, these embodiments are not intended to limit the present invention to any specific example, embodiment, environment, applications or particular implementations described in these embodiments. Therefore, description of these embodiments is only for purpose of illustration rather than to limit the present invention. It should be appreciated that, in the following embodiments and the attached drawings, dimensional relationships among individual elements in the attached drawings are illustrated only for ease of understanding, but not to limit the actual scale unless specifically claimed as such.

Figures 4, 5:
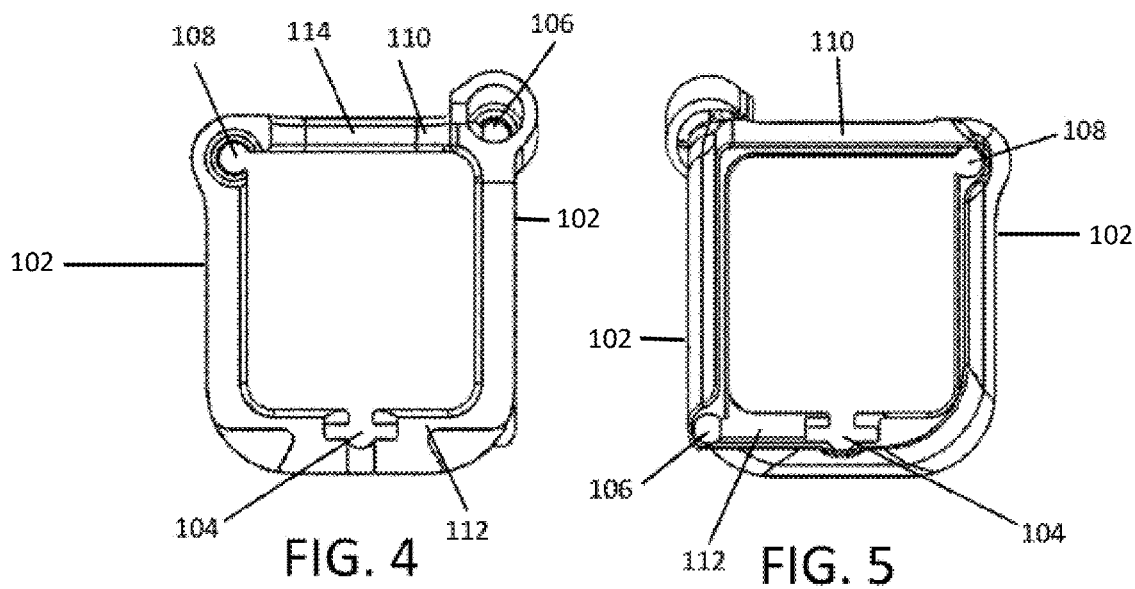
FIG. 4 is a top view of a tubular portal in accordance with embodiments of the invention.
FIG. 5 is a bottom view of a tubular portal in accordance with embodiments of the invention.
Figure 6:
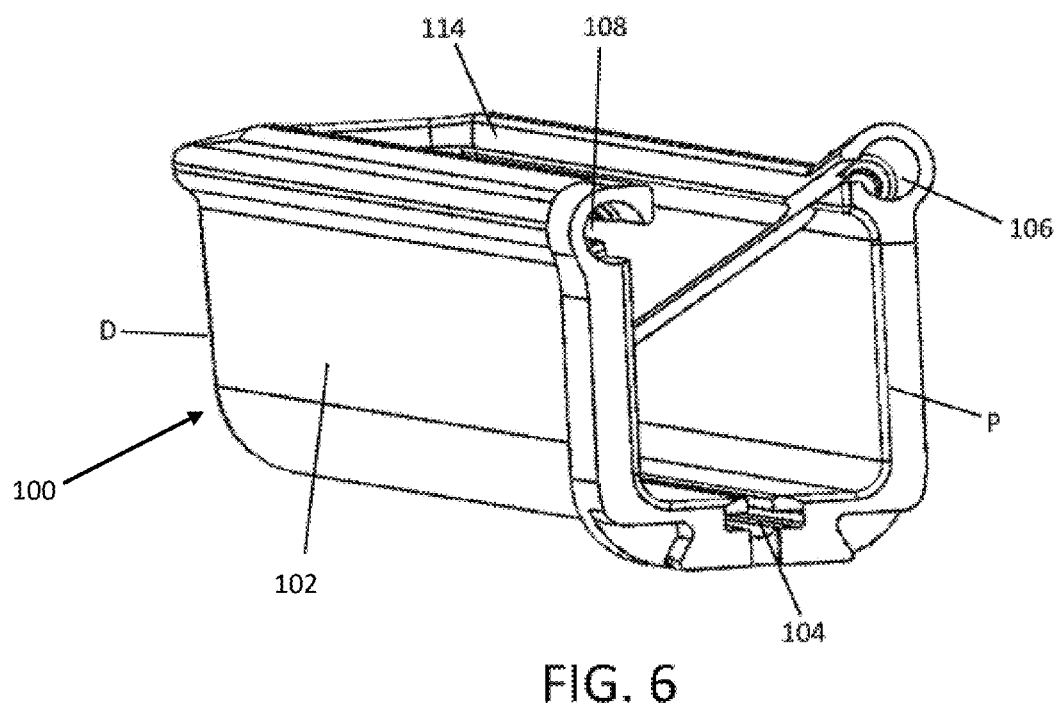
FIG. 6 is a perspective view of a tubular portal in accordance with embodiments of the invention.

Referring to FIGS. 1-6, the portal tube 100 allows for lateral access to the L4/L5 disc space in spinal surgical procedures in the presence of a high iliac crest without going through the ilium. The portal tube 100 may be configured as an elongated enclosed tubular body with a generally rectangular cross-sectional shape. The corners of the rectangle can be rounded as shown in FIGS. 4-6. Other shapes, including but limited to oval and square are contemplated.

The portal tube 100 can include channels, grooves, T-slots, indentations or other attachment features defined on or in one or more of the walls 102 thereof that form the tubular body. A T-shaped slot or channel 104 can be defined in a sidewall portion. The T-slot 104 defines a narrow opening into the interior of the tube's body and a wider internal width inside of the wall 102.

The portal tube 100 also includes a pair of fixation pin channels 106, 108 on the cephalad and caudal sides on the tube, going into the L4 and L5 vertebral bodies respectively. Due to the angled trajectory of the tube 100, as will be discussed below, the L5 pin channel 108 (or a portion thereof) has a 15° angle inward (corresponding to the 15° jog of the tube) from vertical, towards the center of L5. The L4 pin channel 106 is angled so that it starts at the caudal side of the tube 100 at the proximal end P of the tube 100, and exits the tube 100 on the cephalad side at the distal end D of the tube 100, reducing the trajectory angle of the pin into L4, which allows for more engagement of the pin into L4. As such, the L4 channel 106 is angled so that it begins at or near the proximal end of the body 100 laterally-adjacent to a first lateral wall portion 110 of the body and terminates at or near a distal end of the body 100 laterally-adjacent to a second lateral wall portion 112 that is located opposite the first lateral wall portion.

In certain embodiments, the L4 pin 106 can be shortened to provide for 5 mm to 12 mm of engagement into the L4 vertebrae. Lowering the angle of trajectory can increase the engagement length into the L4.

Additional engagement of the L4 pin aids in fixing the tube to the anatomy and will reduce unwanted tube movement.

The tube 100 comprises a 15° jog 101 inward that is located adjacent to the distal end D of the tube 100. The jog 101 positions the distal portion of the tube on the cephalad side of the ilium. A different degree of jog 101 can be provided in additional embodiments to facilitate lateral access to the L4/L5 disc space in spinal surgical procedures in the presence of a high iliac crest without going through the ilium. Performing a spinal surgical procedure by going around the ilium is preferred over going through the ilium.

A longitudinally-extending opening 114 can be defined in the tubular body 100 from the proximal end thereof and extending towards the distal end thereof. The opening 114 allows for free movement of surgical instruments while maintaining a small surgical access opening. This embodiment may be particularly useful when accessing the L4-L5 vertebral segment. In use, opening 114 faces the patient's ileac crest to allow for access for instrumentation.

The entirety of U.S. Pat. No. 11,065,131 B2 is hereby incorporated herein by reference.

The present invention may be embodied in other specific forms without departing from the spirit or essential attributes thereof, and it is, therefore, desired that the present embodiment be considered in all respects as illustrative and not restrictive. Those skilled in the art may recognize other equivalents to the specific embodiment described herein which equivalents are intended to be encompassed by the claims attached hereto.

What is claimed is:

1. A surgical portal for intervertebral surgical fusion procedures, comprising:
    a longitudinally elongated hollow body having a longitudinal extent between a proximal end and a distal end, wherein the body defines a jog portion disposed contiguous with the distal end of the body, the jog portion extending for a limited portion of the longitudinal extent of the body;
    a first channel that extends longitudinally through the body from the proximal end to the distal end, wherein the first channel includes a first channel portion that passes through the jog portion; and
    a second channel that extends through the body from the proximal end to the distal end;
    wherein the second channel is angled diagonally so that the second channel begins at the proximal end of the body from a protrusion that extends laterally externally outward from a first side of a lateral wall portion of the body and terminates at a distal end of the body adjacent to a second side of the lateral wall portion, wherein the second side of the lateral wall portion is located opposite the first side of the lateral wall portion.

2. The surgical portal of claim 1, further comprising a T-shaped slot that extends longitudinally through the body from the proximal end to the distal end.

3. The surgical portal of claim 2, wherein the T-shaped slot includes an opening into an interior of the body that is narrower than a widest width dimension of the T-shaped slot.

4. The surgical portal of claim 1, wherein the first channel and the second channel are each circular bores when viewed in a lateral cross-section.

5. The surgical portal of claim 1, wherein the body, when viewed in a lateral cross-section, is a rectangle with rounded corners.

6. The surgical portal of claim 1, wherein the distal end of the body is angled with respect to the proximal end of the body.

7. A surgical portal for intervertebral surgical fusion procedures, comprising:
    a hollow body that extends longitudinally between a proximal end and a distal end, the body is defined by a first lateral wall, a second lateral wall, a third wall, and a fourth wall, wherein the second lateral wall is opposite the first lateral wall and the third wall and the fourth wall extend between the first lateral wall and the second lateral wall;
    a first straight channel that extends longitudinally through the fourth wall between the proximal end and the distal end;
    a second straight channel that extends diagonally through the third wall from the proximal end to the distal end;
    wherein the second channel extends from a protrusion disposed at the proximal end of the body at a first corner of the third wall and is angled such that the channel terminates at a second corner of the third wall disposed at the distal end of the body, wherein the first corner and the second corner are diagonally opposite one another wherein the protrusion extends laterally externally outward from the third wall.

8. The surgical portal of claim 7, further comprising a T-shaped slot defined longitudinally through the body from the proximal end thereof to the distal end thereof.

9. The surgical portal of claim 8, wherein the T-shaped slot includes an opening into an interior of the body that is narrower than a widest width dimension of the T-shaped slot.

10. The surgical portal of claim 7, wherein the second channel is a circular bore when viewed in a lateral cross-section.

11. The surgical portal of claim 7, wherein the body, when viewed in a lateral cross-section, is a rectangle with rounded corners.

12. The surgical portal of claim 7, wherein the distal end of the body is angled with respect to the proximal end of the body.

13. The surgical portal of claim 7, wherein the body includes a jog portion disposed contiguous with the distal end, the jog portion extending for a limited portion of a longitudinal extent of the body.

14. The surgical portal of claim 13, wherein the jog portion includes a wall surface that is disposed at an angle relative to a longitudinal axis of the body and the wall surface is non-parallel with the longitudinal axis of the body; and wherein the second channel extends at the angle relative to the longitudinal axis of the body.

\* \* \* \* \*